US 7,808,699 B2

(12) United States Patent
Ulrich et al.

(10) Patent No.: US 7,808,699 B2
(45) Date of Patent: Oct. 5, 2010

(54) MICROSCOPE LENS FOR TOTAL INTERNAL REFLECTION MICROSCOPY AND MICROSCOPE

(75) Inventors: Heinrich Ulrich, Heidelberg (DE); Werner Knebel, Kronau (DE); Kyra Moellmann, Trippstadt (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 897 days.

(21) Appl. No.: 10/573,440

(22) PCT Filed: Sep. 23, 2004

(86) PCT No.: PCT/EP2004/052284

§ 371 (c)(1),
(2), (4) Date: Dec. 21, 2006

(87) PCT Pub. No.: WO2005/031431

PCT Pub. Date: Apr. 7, 2005

(65) Prior Publication Data

US 2007/0097496 A1    May 3, 2007

(30) Foreign Application Priority Data

Sep. 25, 2003  (DE) ................. 103 44 410
Sep. 10, 2004  (DE) .............. 10 2004 044 275

(51) Int. Cl.
*G02B 21/06*    (2006.01)
(52) U.S. Cl. ...................... 359/385; 359/390
(58) Field of Classification Search ............ None
See application file for complete search history.

(56) References Cited

U.S. PATENT DOCUMENTS

| 4,291,938 | A | 9/1981 | Wagner ........................ 350/91 |
| 5,887,009 | A | 3/1999 | Mandella et al. ................ 372/6 |
| 6,195,203 | B1 * | 2/2001 | Kadogawa ................... 359/385 |
| 6,504,653 | B2 | 1/2003 | Matthae et al. .............. 359/656 |
| 6,819,484 | B2 * | 11/2004 | Aono et al. .................. 359/368 |
| 6,987,609 | B2 | 1/2006 | Tischer et al. ............... 359/385 |
| 7,595,889 | B2 * | 9/2009 | Wax et al. .................... 356/456 |
| 2002/0097489 | A1 | 7/2002 | Kawano et al. .............. 359/388 |
| 2003/0058530 | A1 | 3/2003 | Kawano ...................... 359/385 |
| 2004/0001253 | A1 | 1/2004 | Abe et al. .................... 359/388 |
| 2004/0047032 | A1 | 3/2004 | Gonschor et al. ........... 359/368 |
| 2005/0141810 | A1 * | 6/2005 | Vaez-Iravani et al. ......... 385/33 |

FOREIGN PATENT DOCUMENTS

| DE | 199 27 724 A1 | 1/2000 |
| DE | 101 08 796 A1 | 9/2002 |
| DE | 101 43 481 A1 | 3/2003 |
| DE | 102 17 098 B4 | 11/2003 |
| DE | 102 29 935 | 1/2004 |
| GB | 2 338 568 A | 12/1999 |
| WO | WO 03/023483 A2 | 3/2003 |
| WO | WO 03/087914 A2 | 10/2003 |

* cited by examiner

OTHER PUBLICATIONS

International Search Report for PCT/EP2004/052284 (3 pages).

*Primary Examiner*—Arnel C Lavarias
(74) *Attorney, Agent, or Firm*—Leydig, Voit & Mayer, Ltd.

(57) ABSTRACT

A microscope objective includes an optical fiber. The optical fiber can deliver light for total internal reflection microscopy. The optical fiber can couple illumination light directly into the microscope objective through the optical fiber.

35 Claims, 2 Drawing Sheets

MICROSCOPE LENS FOR TOTAL INTERNAL REFLECTION MICROSCOPY AND MICROSCOPE

The invention relates to a microscope objective, especially for total internal reflection microscopy.

The invention also relates to a microscope with a microscope objective.

BACKGROUND

U.S. pat. appl. 2002/0097489 discloses a microscope involving the evanescent illumination of a specimen. The microscope comprises a white-light source whose light is coupled into the specimen slide via a slit diaphragm through the microscope objective for purposes of evanescent illumination. The illumination light propagates itself in the specimen slide as a result of total internal reflection, a process in which the specimen is only illuminated in the area of the evanescent field that projects from the specimen slide. Microscopes of this type are known under the designation TIRFM (Total Internal Reflection Fluorescent Microscope).

The z-resolution of TIRFMs is outstanding due to the fact that the evanescent field projects only about 100 nm into the specimen.

German pat. appl. DE 101 08 796 A1 discloses a high-aperture objective, especially for TIRF applications. The objective consists of a first lens having positive refractive power, a second lens having negative refractive power, whereby the focal length ratio between the two lenses lies within the range from −0.4 to −0.1 and the total refractive power is greater than zero. Moreover, the objective comprises two positive lenses whose diameter-to-focal length ratio is greater than 0.3 and smaller than 0.6. Furthermore, the objective comprises a negative lens and a collective lens, whereby the negative lens faces the front group and the focal length ratio of the negative lens to the collective lens lies between −0.5 and −2.

German pat. appl. DE 102 17 098 A1 discloses an incident-illumination arrangement for TIRF microscopy. This incident-illumination arrangement comprises a source of illumination that, during operation, emits a polarized illuminating bundle of rays that propagates itself at an angle relative to the optical axis, and a deflection device that deflects the illuminating bundle of rays and couples it into the objective parallel to the optical axis. With this incident-illumination arrangement, it is provided that the illuminating bundle of rays emitted by the source of illumination has s-polarization and p-polarization directions having a phase differential and the deflection device reflects the illuminating bundle of rays x times, wherein $x=(n \times 180°-d)/60°$.

German pat. appl. DE 101 43 481 A1 discloses a microscope for TIRM (Total Internal Reflection Microscopy). The microscope has a housing and an objective. The illumination light emitted by an illumination device can be coupled in via an adapter that can be slid into the microscope housing.

U.S. pat. appl. 2004/0001253 discloses a microscope with an optical illumination system that allows a simple switchover between evanescent illumination and reflection illumination. The illumination system comprises a laser light source whose light is coupled into an optical fiber. An outcoupling optical system is also provided that focuses the light emerging from the fiber into a rear focal point of the microscope objective. The optical fiber can be moved in a plane perpendicular to the optical axis of the microscope objective.

German pat. appl. DE 102 29 935 A1 discloses a device for coupling light into a microscope. There, laser light is directed at the preparation in the plane of the illuminated field diaphragm through a light-conductive fiber coupler configured as a slide. The invention is particularly well-suited for the TIRF method.

In scanning microscopy, a specimen is illuminated with a light beam so that the detection light emitted by the specimen can be observed as reflection or fluorescent light. The focus of an illuminating bundle of rays is moved in a plane of the specimen by means of a controllable beam deflector, generally by tilting two mirrors, whereby the deflection axes are usually positioned perpendicular to each other, so that one mirror deflects in the x direction while the other deflects in the y-direction. The mirrors are tilted, for example, employing galvanometric actuating elements. The power of the detection light coming from the object is measured as a function of the position of the scanning beam. Normally, the actuating elements are equipped with sensors to ascertain the actual position of the mirror. Especially in confocal scanning microscopy, an object is scanned in three dimensions with the focus of a light beam.

A confocal scanning microscope generally comprises a light source, a focusing optical system with which the light from the source is focused onto a pinhole diaphragm—the so-called excitation diaphragm—a beam splitter, a beam deflector to control the beam, a microscope optical system, a detection diaphragm and the detectors for picking up the detection or fluorescent light. The illumination light is coupled in by a beam splitter. Via the beam deflector, the fluorescent or reflection light coming from the object returns to the beam splitter, passes through it and is subsequently focused onto the detection diaphragm behind which the detectors are located. This detector arrangement is called a descan arrangement. Detection light that does not stem directly from the focus region takes a different light path and does not pass the detection diaphragm, so that point information is obtained that yields a three-dimensional image as a result of the sequential scanning of the object with the focus of the illuminating bundle of rays. For the most part, a three-dimensional image is attained by means of layer-by-layer image data acquisition.

SUMMARY OF THE INVENTION

It is an object of the present invention to provide a microscope objective, especially for total internal reflection microscopy, that offers the possibility of a reliable, efficient and reproducible illumination of the specimen.

The present invention provides a microscope objective having at least one optical fiber.

It is also an object of the present invention to provide a microscope that offers the possibility of an efficient, reliable and reproducible illumination of the specimen, especially for total internal reflection microscopy.

The present invention also provides a microscope having at least one optical fiber.

In a preferred embodiment of the microscope objective, illumination light can be coupled directly into the microscope objective through the optical fiber. Preferably, at least part of the optical fiber—for instance, the outcoupling end—is mechanically attached in the microscope and/or to the microscope objective. In a particularly preferred variant, the outcoupling end is arranged in a plane (Fourier plane) that is conjugate to the focal plane of the microscope objective. This variant is especially well-suited to generate an evanescent illumination of the specimen. If the microscope objective comprises several planes (Fourier planes) conjugate to the focal plane, it is particularly advantageous to arrange the outcoupling end in the Fourier plane that is closest to the front lens.

Especially in order to generate an evanescent illumination of the specimen in which the illumination light has to be coupled into a specimen slide or into a cover glass at an oblique angle, it is particularly advantageous to arrange the outcoupling end at a lateral distance from the optical axis of the microscope objective.

In a preferred embodiment, the optical fiber has an incoupling end into which illumination light can be coupled.

Preferably, the illumination light exiting from the outcoupling end of the optical fiber passes through the optical edge region of the microscope objective. In this variant, the remaining region of the microscope objective is available for a classic illumination with incident light (simultaneously or sequentially).

Preferably, especially in order to attain an evanescent illumination of the specimen, the illumination light exits from the microscope objective after passing through the microscope objective at an adjustable angle relative to the optical axis. For purposes of setting the angle, the position of the outcoupling end in the microscope objective, especially the lateral distance from the optical axis, can be changed.

In preferred embodiment of the microscope according to the invention, at least one source of illumination light is provided that emits illumination light that can be coupled into the incoupling end of the optical fiber. Preferably, the incoupling end of the optical fiber is arranged in a plane that corresponds to the focal plane of the microscope objective (for example, the intermediate image plane).

In an embodiment, the microscope has a beam deflector with which the illumination light can be directed onto the incoupling end of the optical fiber. In this embodiment variant, the incoupling end of the optical fiber can lie, for example, somewhat outside of the intermediate image field, so that the intermediate image is not disturbed by the presence of the optical fiber.

In a preferred embodiment variant, the microscope is configured as a scanning microscope, especially as a confocal scanning microscope. In this variant, the illumination light that travels through the optical fiber can be employed especially for TIRF illumination. Here, it is especially advantageous that all of the illumination light wavelengths that are also available for classic confocal scanning microscopy can be utilized for the TIRF applications. Evanescent illumination of the specimen with illumination light having several wavelengths can also be simultaneously realized. A quick switchover between evanescent specimen illumination and a scanning illumination of the specimen can be achieved virtually as quickly as desired since the beam deflector of a scanning microscope works very rapidly.

In the case of a confocal scanning microscope, one can switch, for example, from photo activation or photo release to evanescent illumination. The detection can be achieved with a camera and/or a spark detector (for instance, confocal).

According to the invention, the microscope objective can be fitted with several optical fibers or optical fiber bundles, the exit ends of the several optical fibers can be positioned at different places in the microscope objective and can be used as a function of the experiment requirements.

BRIEF DESCRIPTION OF THE DRAWINGS

Exemplary embodiments of the present invention are schematically illustrated in the drawings and will be described below with reference to the drawings; elements that function in the same manner are designated with the same reference numerals. The following is shown.

DETAILED DESCRIPTION

Figure 1:
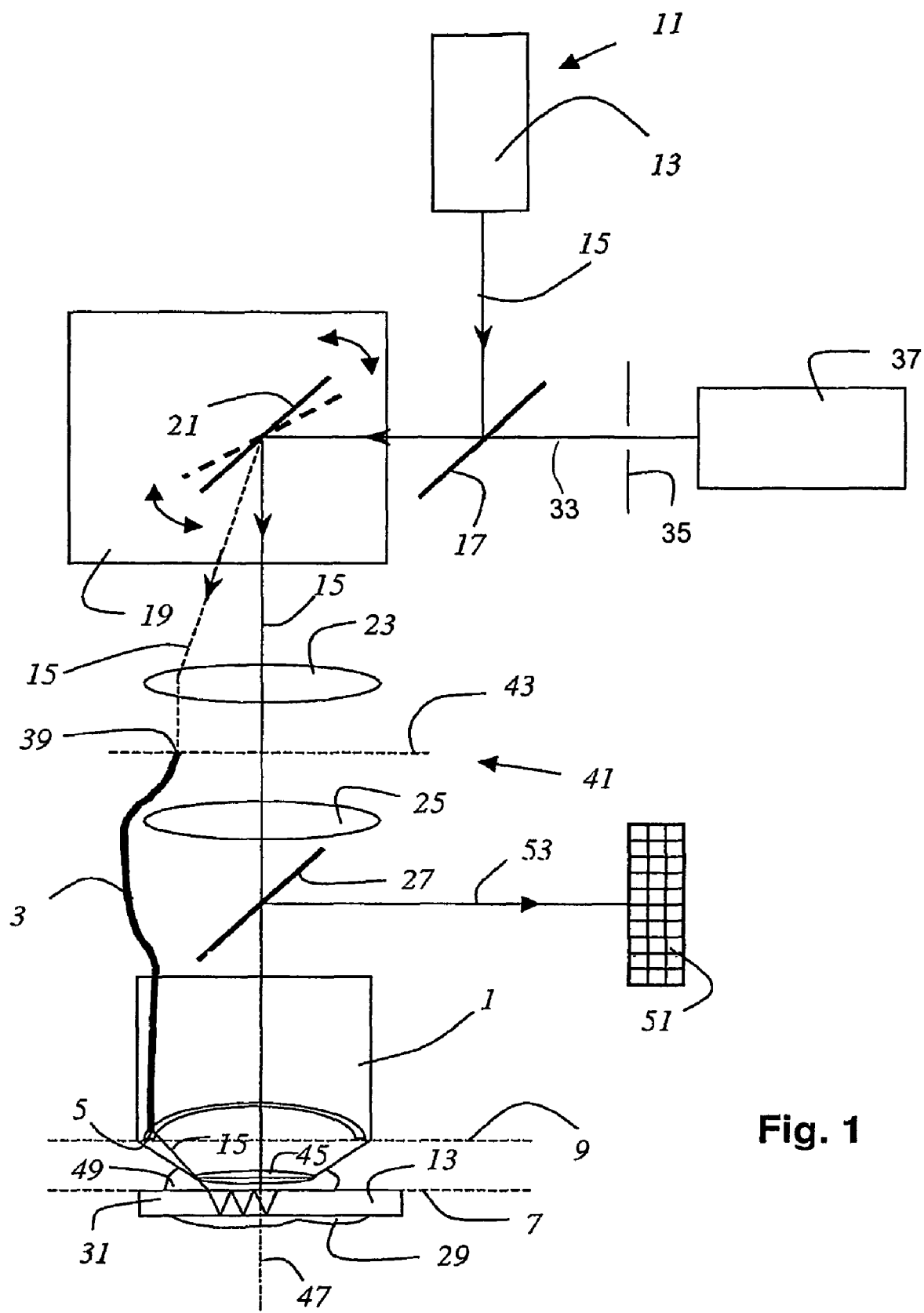
FIG. 1—a scanning microscope according to the invention, with a microscope objective according to the invention.

FIG. 1 shows a microscope according to the invention, which is configured as a confocal scanning microscope, having a microscope objective 1 with an optical fiber 3. This optical fiber 3 has an outcoupling end 5 arranged inside the microscope objective 1, namely, in a Fourier plane 9 that is conjugate to the focal plane 7 of the microscope objective 1. The scanning microscope has a light source 11 configured as a multiline laser 13. The illumination light 15 generated by the illumination light source 11 is deflected by a main beam splitter 17 to a beam deflector 19 that comprises a gimbal-mounted scanning mirror 21. In order to scan the specimen, the beam deflector 19 guides the illumination light through the scanning optical system 23, the tube optical system 25 and through the beam splitter 27 as well as through the microscope objective 1 or through the specimen 29 that has been placed on a specimen slide 31. The detection light 33 coming from the specimen 29 travels along the same light path, namely, through the microscope objective 1, through the beam splitter 27, the tube optical system 25 as well as through the scanning optical system 23, returning to the beam deflector and to the main beam splitter 17, then it passes through the latter and through the subsequent detection pinhole diaphragm 35, finally reaching the detector 37 that is configured as a multiband detector. In order to attain an evanescent specimen illumination (TIRF illumination), the illumination light 15 is deflected by the beam deflector 19 through the scanning optical system 23 onto the incoupling end 39 of the optical fiber 3. The incoupling end 39 is in a plane 41 that corresponds to the focal plane 7 of the microscope objective 1, namely, an intermediate image plane 43. The illumination light 15 that is coupled into the optical fiber 3 runs through the edge region of the microscope objective 1 and exits from the front lens 45 at an oblique angle relative to the optical axis of the microscope objective 1. This angle can be adjusted by changing the distance of the exit end 5 from the optical axis 47 of the microscope objective 1. The microscope objective 1 is optically coupled to the cover glass 31 via an immersion medium 49. In order to generate an image of the evanescently illuminated specimen 29, a camera 51 is on hand that receives the additional detection light 53 that comes from the specimen, passes through the microscope objective and is deflected by the beam splitter 27 to the camera 51.

Figure 2:
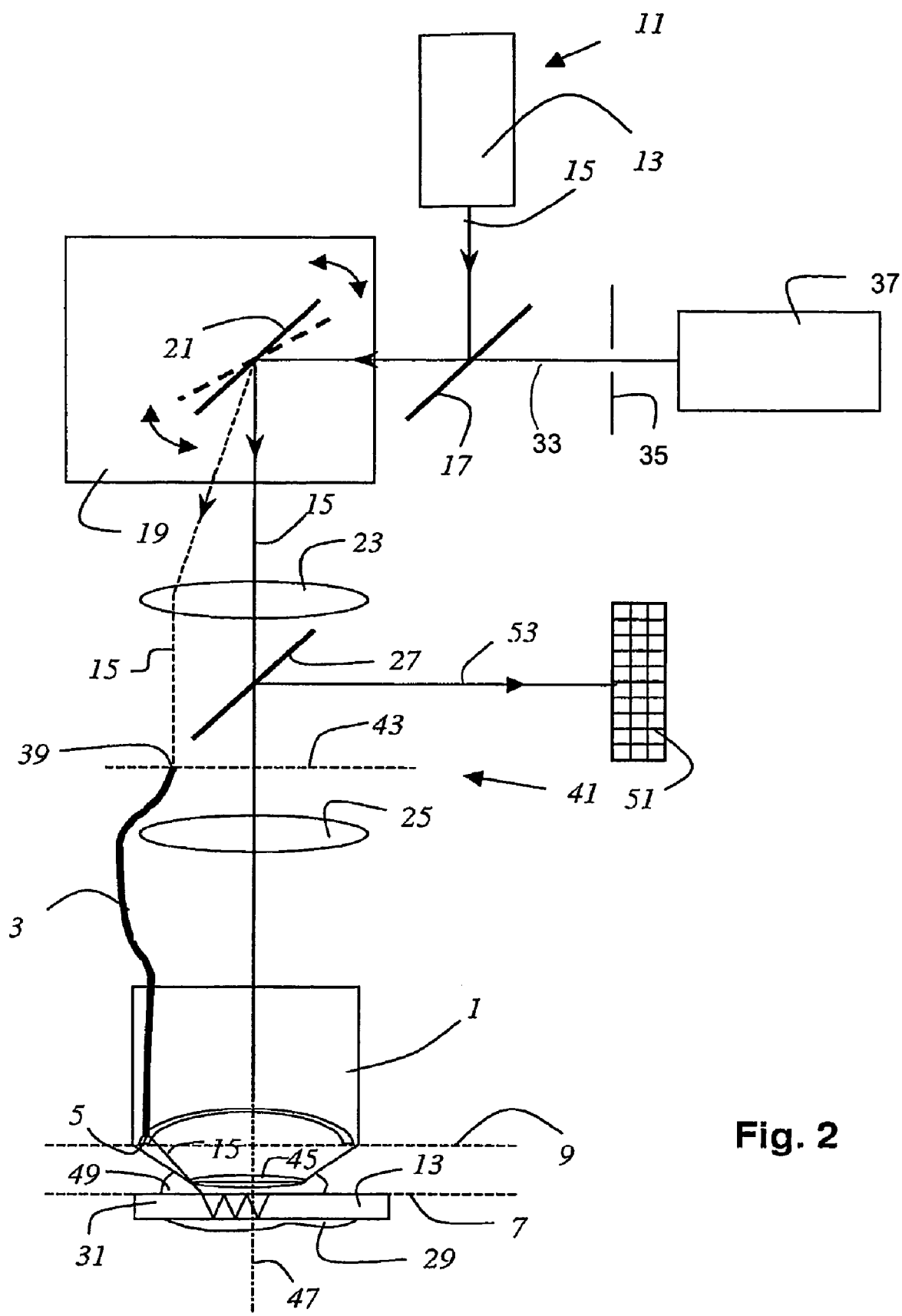
FIG. 2—another microscope with a microscope objective according to the invention. will be described below with reference to the figures; elements that function in the same manner are designated with the same reference numerals. The following is shown.

FIG. 2 shows another microscope according to the invention that is likewise configured as a confocal scanning microscope. In this embodiment variant, the beam splitter 27 that deflects the additional detection light 53 to the camera is arranged above the intermediate image plane 43.

The invention was described with reference to a specific embodiment. However, it goes without saying that changes and modifications can be made without departing from the scope of protection of the claims presented below.

LIST OF REFERENCE NUMERALS 1 microscope objective
2 optical fiber 3 outcoupling end
7 focal plane
9 Fourier plane
11 light source
13 multiline laser
15 illumination light
17 main beam splitter
19 beam deflector
21 scanning mirror
23 scanning optical system
25 tube optical system
27 beam splitter
29 specimen
31 specimen slide
33 detection light
35 detection pinhole diaphragm
37 detector
39 incoupling end
41 plane corresponding to the focal plane 7
43 intermediate image plane
45 front lens
47 optical axis
49 immersion medium
51 camera
53 detection light

What is claimed is:

1. A microscope objective, comprising:
   an optical fiber having:
      an incoupling end; and
      an outcoupling end;
   wherein the incoupling end is configured to receive illumination light and convey the illumination light to the outcoupling end, and the outcoupling end is mechanically attached to a portion of the microscope objective and disposed in a Fourier plane that is conjugate to a focal plane of the microscope objective.

2. The microscope objective as recited in claim 1 wherein the optical fiber is configured to deliver the illumination light for total internal reflection microscopy.

3. The microscope objective as recited in claim 1 wherein the optical fiber is configured to couple illumination light directly into the microscope objective through the optical fiber.

4. The microscope objective as recited in claim 1 wherein at least part of the optical fiber is mechanically attached to a portion of the microscope objective.

5. The microscope objective as recited in claim 1 wherein the optical fiber has an outcoupling end disposed in a portion of the microscope objective.

6. The microscope objective as recited in claim 5 wherein the outcoupling end is disposed in a plane that is conjugate to a focal plane of the microscope objective.

7. The microscope objective as recited in claim 6 wherein the plane is a Fourier plane.

8. The microscope objective as recited in claim 6 wherein the plane is a plane, closest to a front lens of the microscope objective, that is conjugate to the focal plane of the microscope objective.

9. The microscope objective as recited in claim 8 wherein the plane is a Fourier plane of the microscope objective.

10. The microscope objective, as recited in claim 5 wherein the outcoupling end is disposed at a lateral distance from an optical axis of the microscope objective.

11. The microscope objective as recited in claim 1 wherein the optical fiber has an incoupling end configured to have illumination light coupled thereinto.

12. The microscope objective as recited in claim 11 wherein the optical fiber has an outcoupling end disposed in a portion of the microscope objective so that illumination light exiting from the outcoupling end passes through an optical edge region of the microscope objective.

13. The microscope objective as recited in claim 1 wherein the objective is configured to have illumination light, after passing through the objective, exit therefrom at an adjustable angle relative to an optical axis.

14. The microscope objective as recited in claim 13 wherein the optical fiber has an outcoupling end diposed in a portion of the microscope objective, and wherein a position of the outcoupling end in a microscope is changeable so as to set the adjustable angle.

15. A microscope comprising a microscope objective, the microscope objective including;
    at least one optical fiber having:
       an incoupling end: and
       an outcoupling end;
    wherein the incoupling end is configured to receive illumination light and convey the illumination light to the outcoupling end, and the outcoupling end is mechanically attached to a portion of the microscope objective and disposed in a Fourier plane that is conjugate to a focal plane of the microscope objective.

16. The microscope as recited in claim 15 wherein the at least one optical fiber is configured to couple illumination light directly into the microscope objective through the at least one optical fiber.

17. The microscope as recited in claim 15 wherein at least part of the at least one optical fiber is mechanically attached to a portion of the microscope objective.

18. The microscope as recited in claim 15 wherein the at least one optical fiber has an outcoupling end disposed in a portion of the microscope objective.

19. The microscope as recited in claim 18 wherein the outcoupling end is disposed in a plane that is conjugate to a focal plane of the microscope objective.

20. The microscope as recited in claim 19 wherein the plane is a Fourier plane of the microscope objective.

21. The microscope as recited in claim 19 wherein the plane is a plane, closest to a front lens of the microscope objective, that is conjugate to the focal plane of the microscope objective.

22. The microscope as recited in claim 21 wherein the plane is a Fourier plane of the microscope objective.

23. The microscope as recited in claim 18 wherein the outcoupling end is disposed at a lateral distance from an optical axis of the microscope objective.

24. The microscope as recited in claim 15 wherein the at least one optical fiber has an incoupling end configured to have illumination light coupled thereinto.

25. The microscope as recited in claim 24 wherein the at least one optical fiber has an outcoupling end disposed in a portion of the microscope objective so that illumination light exiting from the outcoupling end passes through an optical edge region of the microscope objective.

26. The microscope as recited in claim 24 wherein the incoupling end is disposed in a plane corresponding to a focal plane of the microscope objective.

27. The microscope as recited in claim 24 wherein the incoupling end is disposed in an intermediate image plane of the microscope.

28. The microscope as recited in claim 24 further comprising a beam deflector configured to direct the illumination light onto the incoupling end.

29. The microscope as recited in claim 15 wherein the microscope objective is configured to have illumination light, after passing through the objective, exit therefrom at an adjustable angle relative to an optical axis.

30. The microscope as recited in claim 29 wherein the at least one optical fiber has an outcoupling end disposed in a portion of the microscope objective, and wherein a position of the outcoupling end in the microscope is changeable so as to set the adjustable angle.

31. The microscope as recited in claim 15 wherein the at least one optical fiber has an outcoupling end disposed in a portion of the microscope objective, and further comprising at least one illumination light source configured to emit illumination light coupleable into the incoupling end of the at least one optical fiber.

32. The microscope as recited in claim 15 wherein the at least one optical fiber is configured to convey the illumination light so as to provide TIRF illumination.

33. The microscope as recited in claim 15 further comprising an illumination light source configured to emit illumination light coupleable into the at least one optical fiber for TIRF illumination and configured to emit the illumination light so as to bypass the optical fiber for direct specimen illumination.

34. The microscope as recited in claim 15 further comprising a scanning device configured to support scanning microscopy.

35. The microscope as recited in claim 15 further comprising a scanning device configured to support confocal scanning microscopy.

* * * * *